June 5, 1962  G. E. NEVILL, JR  3,037,519
GLOBE VALVE

Filed Dec. 19, 1958  2 Sheets-Sheet 1

Gale E. Nevill, Jr.
INVENTOR.

BY Carl B. Fox, Jr.
ATTORNEY

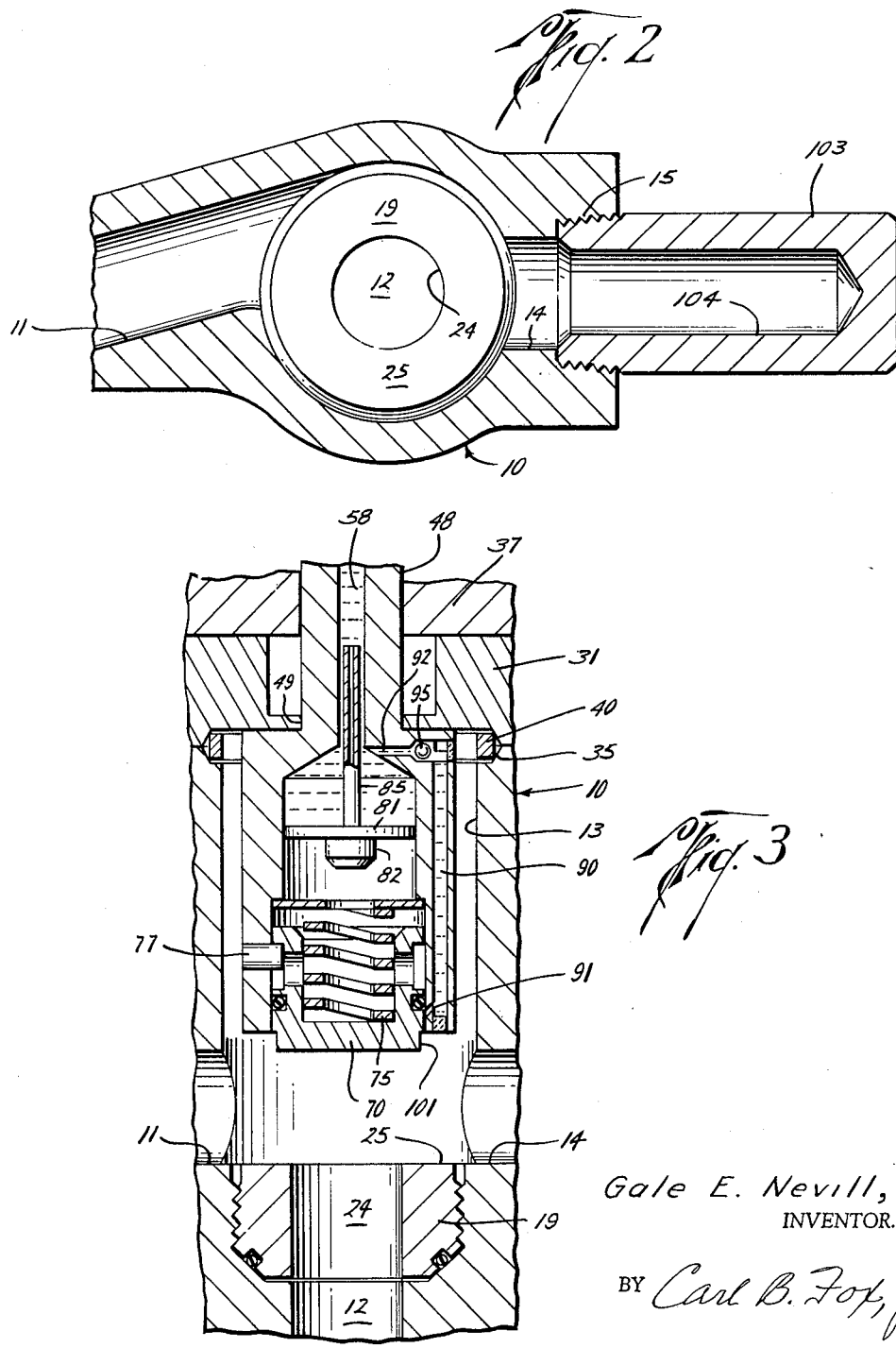

United States Patent Office 3,037,519
Patented June 5, 1962

3,037,519
GLOBE VALVE
Gale E. Nevill, Jr., Los Altos, Calif., assignor to McEvoy Company, Houston, Tex., a corporation of Texas
Filed Dec. 19, 1958, Ser. No. 781,776
5 Claims. (Cl. 137—246.12)

This invention pertains to valves of the automatic sealing type, wherein line pressure is utilized in forming seals when the valve is closed. The valves of this invention operate in the manner of globe valves, although the valve closure elements are not of globe-like form.

A principal object of the invention is to provide a valve of the type described which will close and seal against high pressure.

Another object of the invention is to provide, in such valves, sealing systems which are responsive to internal pressures to form a seal or seals about the closure elements of the valve.

A further principal object of the invention is to provide an automatic self-sealing valve of the globe valve type.

Another object of the invention is to provide such valves of the globe valve type having improved flow characteristics on opening and closing.

In valves which must close and seal against high fluid pressures, such as are encountered in petroleum wells, no valves have been made available which are more satisfactory than those wherein metal-to-metal contact between the closure element and its seat is provided together with the additional provision of a plastic sealant-filled sealant groove intermediate the metal-to-metal contact area. However, such valves have heretofore been limited to gate valves of the type exemplified in United States Letters Patent Number 2,653,789 to Eichenberg, and no satisfactory manner of incorporating the sealing systems in valves of the globe valve form has heretofore been advanced.

The valves herein disclosed have a closure element which is reciprocably movable normally to and from engagement with a seat. The closure element is of compound structure, and has an internal sealant reservoir chamber. The closure element is adapted to automatically supply plastic sealant material from the reservoir to a sealing groove surrounding the contact area between the closure element and its seat when the valve is closed, and thereby provide a fluid-tight seal.

Other objects and advantages of the invention will appear from the following description of a preferred embodiment, reference being made to the accompanying drawings, of which:

FIGURE 2 is a horizontal section taken at the axis of the inlet flow path through the valve, the valve being in "open" condition; and, FIGURE 3 is a partial vertical section similar to FIGURE 1, the valve being in "open" condition.

Figure 1:
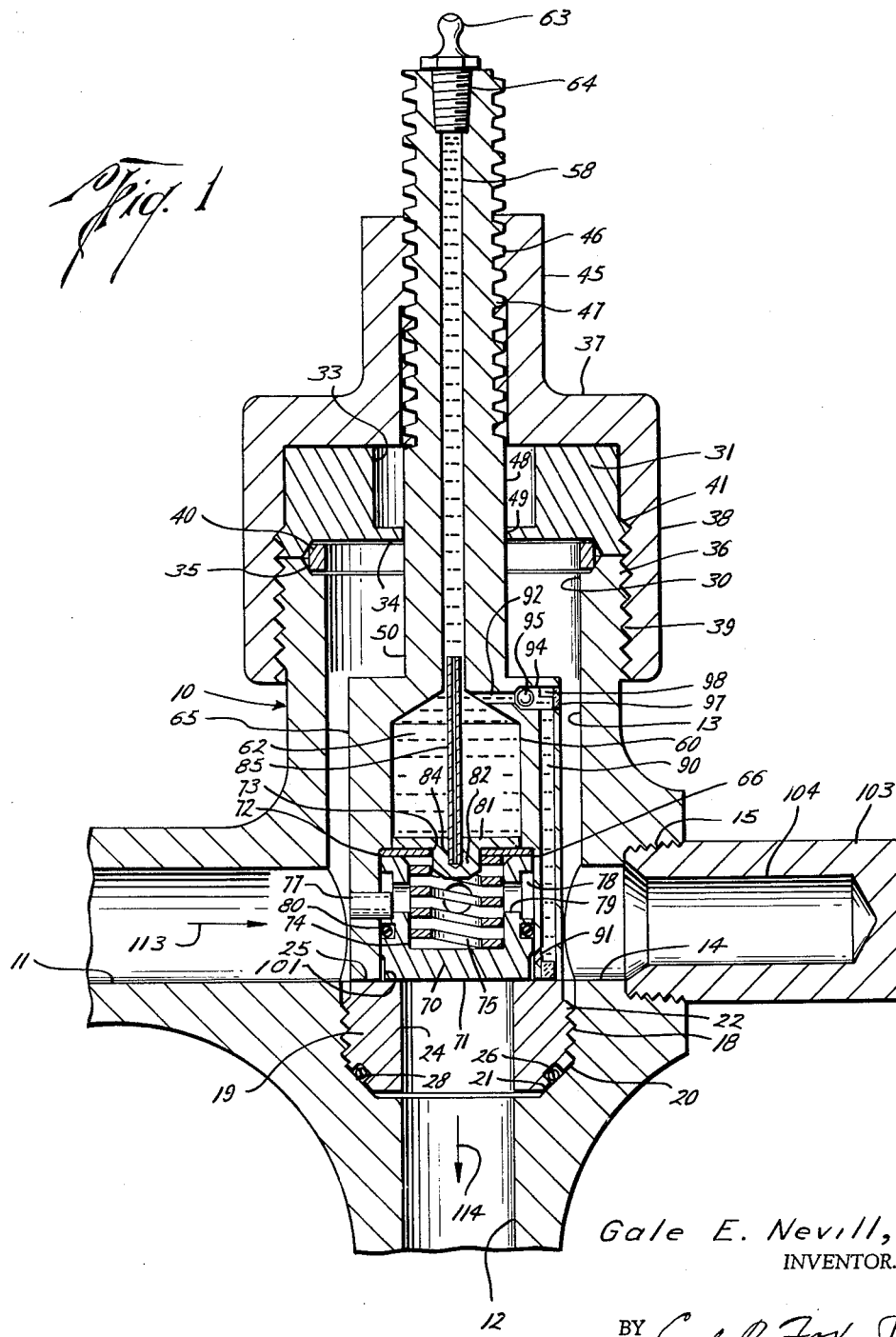
FIGURE 1 is a vertical section of a valve in the preferred embodiment, taken at the axis of the flow paths through the valve, showing the valve in "closed" condition.

Describing the preferred embodiment of the invention as shown in the drawings in detail, and with reference to all of the figures of the drawings, the valve body 10 is usually fabricated of steel, and includes an inlet port 11, or flow path, of curved tangential form, and an outlet port 12, or flow path, of straight cylindrical bore form. A valve hollow or chamber 13 is formed within body 10 between ports 11, 12. At the side of body 10 opposite inlet port 11 there is a port 14, which has a threaded socket formation 15 at its outer end. Port 14 extends from chamber 13 to the valve body exterior.

The tangential form of the entrance of port 11 into chamber 13 provides smooth fluid flow through the valve when the valve is opened, and also tends to eject, by centrifugal action, particulate material carried in the flowing fluid, thus keeping the valve interior clean. The particulate detritus is thrown from the flow stream in the direction of port 14, provided to receive the detritus.

Ports 11, 12 are provided with connection fittings or formations, not shown, at their outer ends, these usually being threaded sockets or bolting flanges of conventional form and integral with body 10. The connections provide means for interconnecting the valve with other equipment, not shown, such as a pipeline system for conveying fluids to and from the valve.

Chamber 13 is of generally cylindrical form, axially aligned above port 12. At its lower end, chamber 13 has a threaded socket formation 18 into which there is screwed the seat member 19 of the valve. Below the threads, chamber 13 has a downwardly converging conical seat surface 20, and member 19 has a corresponding conical lower edge surface 21 urged thereagainst by its threads 22 screwed into threads 18. Seat member 19 is ring shaped, the threads 22 being about its outer periphery, and there being an axial port 24 therethrough of the same diameter as port 12 and forming a continuation of port 12. The upper surface 25 of member 19 is aligned with the lower sides of ports 11, 14 when member 19 is screwed down into position at the lower end of chamber 13. Surface 21 of member 19 has a groove 26 therearound to receive an O-ring 28, the O-ring forming a fluid-tight seal between surfaces 20, 21.

Chamber 13 opens upwardly at circular bonnet opening 30, from body 10, the chamber being of cylindrical form therebelow to threads 18. A bonnet 31 serves as closure means for closing opening 30. Bonnet 31 is of disc shape, having an upper cylindrical recess 33 at its upper surface, and a shallower recess 34 with conical sides at its lower surface, recess 34 being of larger diameter than recess 33 and being opposite a similarly formed ring-shaped recess 35 about chamber opening 30 at the upper end of body 10.

Body 10 is threaded at 36 about its exterior upper end. A cap member 37 has downwardly-extending skirt-like flange 38, flange 38 being threaded at 39 about its lower interior to thread onto threads 36. A steel ring gasket 40 is disposed between the conical sides of recesses 34, 35 at the bonnet-body joint to provide a high pressure fluid-tight seal about the joint. Bonnet 31 is also threaded at its lower exterior at 41 to threadingly engage the upper threads of threaded formation 39.

Cap 37 has an upstanding tubular formation 45 at its center. A threaded bore 46 through cap 37 and formation 45 receives threads 47 of valve stem 48. Bonnet 31 has an axial opening 49 therethrough closely engaging stem 48 at its cylindrical portion 50 below the threads 47. Stem 48 is of elongate cylindrical form, and its threaded portion 47 forms its upper part, and its cylindrical smooth-walled portion 50 forms its lower part. Stem 48 has therethrough an axial bore 58 forming the upper entrance into a reservoir 60 for a supply of sealing material 62. Bore 58 is closed at its upper end by a removable plug 63 which is threaded and is screwed into a threaded socket 64 at the upper end of the bore.

Reservoir 60 is formed within an enlarged cylindrical lower end portion 65 of stem 48. The cavity in the lower end of stem portion 65, the upper portion of the cavity being reservoir 60, opens at the lower end of stem portion 65, and the lower cylindrical portion 66 of the cavity is larger in diameter than reservoir 60 (which is also of cylindrical form). Cavity portion 66 is also larger in diameter than bores 12, 24 above which it is axially aligned.

A spring plug 70 of outward cylindrical form and having lower flat seat engaging surface 71 is closely but movably received within cavity portion 66, surface 71 being flush with the lower end of stem portion 65 when the valve is closed, as will be later described. A flat steel ring 72 is disposed in cavity 66 above plug 70 and against the shoulder formed at the transition between cavity portions 60, 66. Ring 72 has a circular opening 73 concentrically therethrough of smaller diameter than a concentric cylindrical spring recess 74 opening from the upper end of plug 70. A helical compression spring 75 is disposed within recess 74 and bears at its upper end against ring 72 and at its lower end against the bottom of recess 74, thus providing means for biasing plug 70 downwardly in cavity 66.

Downward movement of plug 70 in cavity 66 is limited by a plurality of nipples 77 each radially fitted through a suitable hole through the tubular wall of stem portion 65, the nipples each terminating flush with the outer wall of the stem, but each extending inwardly a short distance into cavity 66. Plug 70 has a circular groove 78 therearound into which the inner ends of the nipples extend. Groove 78 is proportioned so that its upper side abutting nipples 77 stops downward movement of plug 70 at a desired point and so that its lower side is engaged with nipples 77 when plug 70 is in its uppermost position against ring 72. Nipples 77 are tubular so that fluid flow can take place therethrough between chamber 13 and groove 78. A dashed line showing of the nipple 77 flow path is shown in FIGURE 1.

A plurality of circularly spaced circular radial ports 79 are provided from the radially inward bottom of groove 78 to spring recess 74, the nipples 77, groove 78, and ports 79 providing fluid communication from the exterior of portion 65 of stem 48 to recess 74, said fluid communication extending also to reservoir 60 through hole 73 in ring 72.

An O-ring 80 disposed in a circular groove around plug 70 spaced below groove 78 provides a fluid-tight seal around plug 70 in cavity 66, yet permits the plug to be slidingly moved axially.

A piston 81 is sealingly and slidingly disposed in reservoir 60. Piston 81 is of flat circular disc shape, and has a downwardly projecting boss 82 centrally of its lower side, boss 82 being cylindrical and having lower bevel edges and being capable of reception through hole 73 in ring 72, and partially through helical spring 75. In this position the surrounding parts of the piston rest upon ring 72, which thus serves as means for limiting downward piston movement in reservoir 60. Reservoir 60 is conical at its upper end, upwardly converging, to its entrance from bore 58, and the upper end of the reservoir serves as means for limiting upward movement of piston 81 in reservoir 60. Piston 81 has a bore 84 extending downwardly from its upper center to partway through boss 82. A tubular centering rod 85 is press-fitted at its lower end into bore 84. Rod 85 extends upwardly through reservoir 60 into the lower end of bore 58 and therefore serving as means for maintaining piston 81 centered and horizontal within reservoir 60. The longitudinal opening of tubular rod 85 permits its introduction into bore 84, allowing escape of fluids from beneath the lower rod end.

Lower end portion 65 of stem 48 includes a vertical port 90 extending through the side wall surrounding cavities 60, 66 from near the top of stem portion 65 to near the lower end thereof. Port 90 can conveniently be formed by drilling through from the lower end and then welding the lower end of the drill bore closed. A diagonal or angular port 91 provides fluid communication between the lower end of port 90 and the lower interior of cavity 66, the lower inner termination of port 91 being spaced closely from the lower end of the stem. A horizontal port 92 extends radially from the conical top of reservoir 60 towards the upper end of port 90. A check valve chamber 94 and ball check valve 95 form a valved connection between ports 90, 92, chamber 94 and port 92 being conveniently formed by drilling port 92 radially from the stem exterior and then counterboring chamber 94, after which the radially outer end of the chamber is closed by a weld 97. A stop 98 held in place by weld 97 is included to prevent movement of ball 95 to a position closing the top of port 90. Ball valve 95 is a unidirectional check valve means permitting fluid flow from port 92 to port 90 but preventing fluid flow in the opposite direction, and may be replaced by any other suitable type of check valve, including spring biased and other biased types.

Movable plug 70 has a circular recess 101 around its lower outer sides, this recess extending from the lower end of the plug to a level above the lower inner end of diagonal port 91 when plug 70 is disposed fully upwardly in cavity 66. Recess 101 will hereinafter sometimes be referred to as a sealing groove, since it performs that function when the lower end of stem 48 and the peripheral portion of plug surface 71 are against the upper or seat surface 25 of seat ring 19, the lower side of recess 101 being then closed by surface 25.

A hollow bull plug 103 is screwed into threads 15 of port 14. The chamber 104, or hollow, of the bull plug serves as a receptacle for accummulation of detritus, such as sand, dirt, metal particles, and the like, which are centrifugally thrown from fluid entering the valve through tangential inlet port 11. Bull plug 103 can be periodically removed for removal of the accummulated detritus and for limited inspection of the valve interior. If desired, a conduit, such as a pipe, can be threadedly connected at threaded socket 15 to serve as a by-pass past the valve closure or as a second inlet to the valve.

To fill reservoir 60 with sealant material, threaded plug 63 is unscrewed at threads 64 and removed. The sealant material can then be introduced through port 58, for example by screwing an injection fitting into threads 64, to completely fill reservoir 60 with sealant.

The sealant material is a viscous liquid containing suspended particles of a solid material or materials. One type of sealant material which has been successfully used comprises polymerized castor oil containing finely divided mica and/or asbestos in suspension. Such sealant materials when disposed at or adjacent small cracks between metal surfaces act to form high pressure seals at the cracks when a high fluid pressure is applied across the crack.

Referring now to FIGURE 3, the valve stem 48 is shown moved to a raised or "up" position with respect to its "down" position shown in FIGURE 1. The plug 70 is carried upwardly within stem cavity 66, but is moved downwardly by the biasing action of compression spring 75. Nipples 77 are disposed against the upper side of groove 78, which is moved downwardly with the plug. The "up" stem position of FIGURE 3 corresponds with the "open" condition of the valve, and the "down" stem position of FIGURE 1 corresponds with the "closed" condition of the valve. The valve is, of course, opened and closed by appropriate rotation of stem 48, there usually being a handle means (not shown) provided at the upper end of stem 48 outside body 10, for example, a handwheel.

The valve elements disposed within cavities 60, 66 are rotated with the stem during its opening and closing movement.

Referring to FIGURE 1, showing the valve "closed," the plug 70 is forced upwardly into cavity 66 by contact with seat surface 25. The lower end of the stem is also in contact with seat surface 25. Recess 101 is against surface 25, bonded inwardly and outwardly by the plug and stem, respectively. Reservoir chamber 60 is at least partly filled with sealant, so that piston 81 is below the upper end of the reservoir. Fuid in port 11, its direction of flow when the valve is open being indicated by arrow 113, enters valve chamber 13, surrounding the lower end of stem 48, and also flowing through nipples 77, groove 78, and ports 79 into recess 74 and reservoir 60 beneath piston 81. The fluid acts upwardly on the lower side of the piston, urging the piston upwardly and compressing sealant 62 in reservoir 60 to its pressure. Sealant 62 is forced out of reservoir 60 through port 92, check valve 95, port 90, and port 91 into recess 101. Recess 101 is thus kept filled with sealant when the valve is closed as long as an adequate supply of sealant is maintained in reservoir 60 and whenever the pressure in port 11 exceeds the pressure in port 12. Since recess 101 surrounds the upper end of port 24, the same forming an upper extension of port 12, the sealant therein forms a fluid-tight seal to prevent flow of fluid from port 11 to ports 24, 12. Therefore, when the valve is closed, a closure against high pressure flow is effected. A "groovefull" of sealant material is used during each valve operating cycle even though port 91 is closed before the valve is opened. Hence the difference in vertical position of piston 81 as shown in FIGS. 1 and 3.

When stem 48 is rotated to open the valve, the stem rotation being in a direction to raise stem 48 with respect to body 10 and cap 37, the tubular lower stem end is first moved away from seat surface 25, but plug 70 biased against surface 25 by spring 75 remains in contact with surface 25 until stem 48 has been moved upwardly a greater distance than the vertical clearance above nipples 77 in groove 78, at which time contact with the nipples raises the plug off the seat with the stem. When the stem has been elevated, the valve is open and fluids may flow through the lower part of chamber 13 between ports 11, 12.

When the valve is open (FIGURE 3), the side of plug 70 closes the lower inner end of diagonal port 91 so that no sealant can flow therefrom. Should this closure not be entirely effective, there will still be no flow of sealant from port 91, since the pressures below piston 81 and at the exit from port 91 are equal.

An important feature of the valve results from the axial movement of plug 70 on opening and closing the valve. During the initial stages of opening and the final stages of closing, a throttling action takes place, causing high fluid velocities to occur and resulting in a localized pressure reduction in the vicinity of the entrance to port 24. Such unbalanced pressure across the closure element would ordinarily cause the sealant 62 to be sucked from reservoir 60 through recess 101, and thereby lost into the high velocity fluid stream at the point of throttling. Loss of sealant in this manner is prevented, however, because plug 70 closes diagonal port 91 when stem 50 is only a short distance fom the seat, so that reservoir 60 is closed and sealant cannot be sucked out and lost. When the valve is being opened, plug 70 remains seated until port 91 has been closed, after which the throttling action that takes place when plug 70 is raised from seat surface 25 has no effect on the sealant. And when the valve is being closed, plug 70 is brought to rest on seat surface 25 first, so that the throttling action is completed before port 91 is opened by the relative travel between enlarged stem portion 65 and plug 70.

Therefore, the valves herein disclosed is to be distinguished from other valves wherein the sealant supply is at some time subject to being lost because of pressure differentials across the closure means. The sealant supply is completely and positively shut off at all times when such a pressure differential can exist; hence, the valve cannot be operated to cause inadvertant loss of sealant from the reservoir so that dependable operation is assured over lengthy periods of use, and many opening and closing operations of the valve, before the sealant supply in reservoir 60 need be replenished.

Furthermore, the fact that enlarged stem portion 65 leaves seat surface 25 ahead of plug 70 on opening the valve decreases the longitudinal force on stem 48 necessary to open the valve, since the differential pressure to be overcome in opening the valve is present only over the area of plug 70 which is seated around port 24 on seat surface 25. Thus, the required opening force is much less than it would be were enlarged stem portion 65 also required to be moved off of the seat against the differential pressure between port 11 and ports 12 and 24.

The direction of outflow of fluids through ports 24, 12 is indicated by arrow 114.

When stem 48 is rotated to close the valve, the rotation being in a direction to lower the stem at threads 46, 47, the lower end of plug 70 first comes into contact with surface 25, and then further lowering of the stem brings the lower stem end into contact therewith. This sequence permits a smoother and more controllable throttling action when the valve is closed than would occur were plug 70 and the stem fixed with respect to each other, or integral. However, this latter form is available in case the superior throttling action is not desired. The movable plug structure also improves the flow action when the valve is opened, stem 48 leaving seat surface 25 in advance of plug 70 as has been described, and cutting down the contact area between seat and closure as described.

While a preferred embodiment of the invention has been shown and described, many modifications thereof may be made by a person skilled in the art without departing from the spirit of the invention, and it is intended to protect by Letters Patent all forms of the invention falling within the scope of the following claims.

I claim:

1. A valve comprising, a body having a chamber therewithin and an inlet therethrough to said chamber and an outlet therethrough from said chamber perpendicular to said inlet, said chamber being of cylindrical form, said inlet comprising a tangential entrance to a side of said chamber, said outlet being at the center of an end of said chamber, a removable ring-shaped seat disposed about said outlet adjacent said chamber, the end of said chamber opposite said outlet being closed by a perforate bonnet means, a stem disposed through said bonnet perforation for axial movement therethrough and in sealing relation therewith, said stem movement also being axially of said chamber, said stem comprising a concentric enlargement thereof disposed within said chamber and an end cavity open toward said seat within said enlargement, a spring-biased plug disposed within said end cavity and extending therefrom toward said seat when said stem enlargement is not engaged with said seat to close the valve, said enlargement and plug being spaced from said seat when said stem is moved in one axial direction to open the valve and said enlargement and plug being engaged with said seat when said stem is moved in the opposite direction to close the valve, said plug being depressed against the spring bias and into said cavity when the valve is closed, a reservoir for sealant within said cavity spaced from said stem end, passage means through said stem enlargement between said cavity and chamber, a piston open to valve internal pressure through said passage means at one side within said reservoir and disposed between said plug and reservoir, port means from said reservoir through said stem, a sealing groove around said stem end, means opening said port means to said sealing groove only when the valve is closed and said plug is depressed, said groove surrounding said outlet when the valve is closed, whereby sealant is conveyed from said reservoir through said port means to said sealing groove in response to valve internal pressure when the valve is closed to seal the valve.

2. The combination of claim 1, including means for filling said reservoir with sealant from the valve exterior, and including check valve means in said stem port means.

3. The combination of claim 2, said sealing groove comprising a recess about said plug between said plug and stem, said spring-bias of said spring-biased plug being provided by a helical compression spring for biasing said plug outwardly in said cavity, means providing lost motion movement between said plug and stem, whereby said plug engages said seat before said stem engages said seat when the valve is closed and said stem leaves said seat before said plug leaves said seat when said valve is opened, and thereby improving the flow throttling action of the valve on closing and opening.

4. An automatic sealing valve comprising a hollow body, the hollow thereof serving as a valve chamber, a continuously open inlet through said body to said chamber, an outlet through said body from said chamber, said body having a planiform seating surface surrounding said outlet and facing said chamber, said outlet being closed when the valve is closed and open when the valve is opened, closure means disposed within said chamber including operating means therefor extending sealingly from said chamber to the exterior of said body for moving said closure means perpendicularly of the plane of said seating surface between an outlet closing position thereof against said seating surface and a fully open position thereof spaced from said seating surface, and sealing means responsive to fluid pressure in said inlet and chamber when said outlet is closed by said closure means to supply a continuous ring of a sealant material around said outlet between said closure means and said seating surface.

5. Globe valve comprising, in combination, a valve body, a chamber within said body, an inlet to said chamber through said body, said inlet being in uninterrupted continuous communication with said chamber, an outlet from said chamber through said body, said body having a planiform seating surface around said outlet and facing said chamber, axially movable stem means extending into said chamber from the exterior of said body perpendicularly of the plane of said seating surface, a sealant reservoir within said stem means within said body, means responsive to fluid pressure in said inlet for pressuring the sealant in said reservoir, said stem means engaging said seating surface around said outlet at the end of said stem means disposed within said chamber when said stem means is moved axially in one direction to close said outlet and said stem means being spaced from said seating surface perpendicularly of the plane of said seating surface at its said end disposed within said chamber when said stem moves is moved axially in the opposite direction to open said outlet, a loop groove in said end of said stem means disposed within said chamber surrounding said outlet and in contact with said seating surface therearound when said valve is closed, port means from said reservoir to said loop groove within said stem, whereby said loop groove is filled with sealant to form a seal about said outlet when said outlet is closed and said inlet is under higher pressure than said outlet.

References Cited in the file of this patent

UNITED STATES PATENTS

| | | |
|---|---|---|
| 515,491 | Hanford | Feb. 27, 1894 |
| 2,584,761 | Volpin | Feb. 5, 1952 |
| 2,622,838 | Stevenson | Dec. 23, 1952 |
| 2,649,110 | Bergquist | Aug. 18, 1953 |
| 2,904,059 | Wynn | Sept. 15, 1959 |